(No Model.)

W. B. RISDON.
WRENCH.

No. 362,661. Patented May 10, 1887.

WITNESSES:

INVENTOR:
W. B. Risdon
BY Munn & Co.
ATTORNEYS.

UNITED STATES PATENT OFFICE.

WILLIAM B. RISDON, OF TRENTON, NEW JERSEY, ASSIGNOR TO THE AMERICAN SAW COMPANY, OF SAME PLACE.

WRENCH.

SPECIFICATION forming part of Letters Patent No. 362,661, dated May 10, 1887

Application filed December 30, 1886. Serial No. 223,033. (No model.)

*To all whom it may concern:*

Be it known that I, WILLIAM B. RISDON, of Trenton, in the county of Mercer and State of New Jersey, have invented a new and useful Improvement in Wrenches, of which the following is a full, clear, and exact description.

This invention relates to pipe and other wrenches provided with a movable or adjustable jaw; and it consists in a novel construction and combination of parts, including a peculiar spring latch or catch applied to the movable jaw and engaging with notches in the shank or stock of the wrench, substantially as hereinafter described, and pointed out in the claim.

Reference is to be had to the accompanying drawings, forming a part of this specification, in which similar letters of reference indicate corresponding parts in all the figures.

Figure 1:
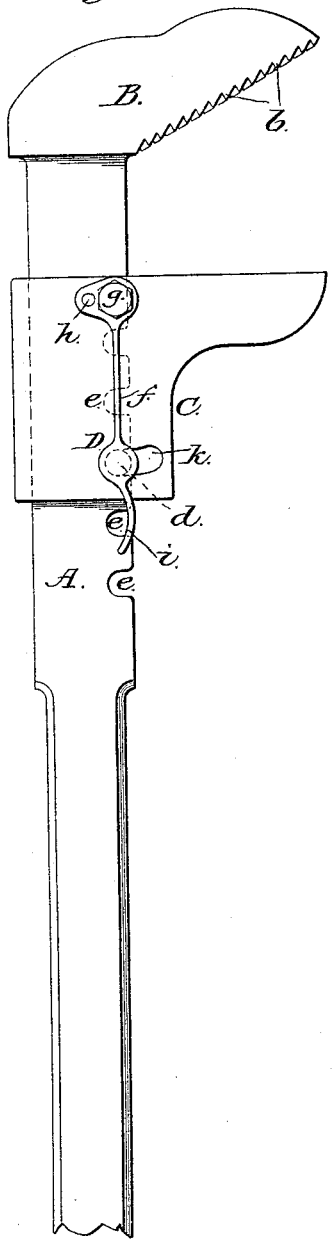
Figure 2:
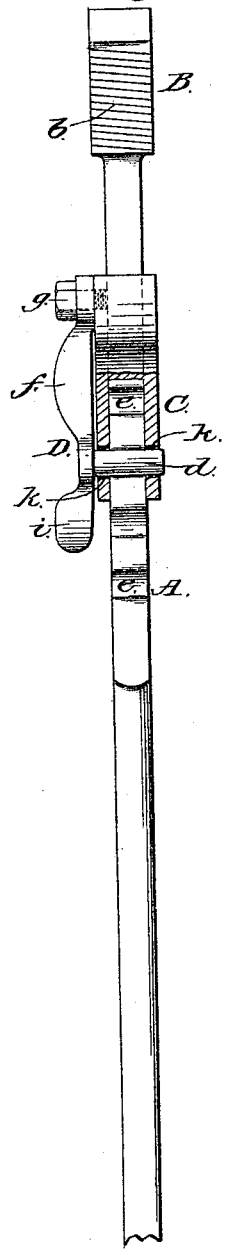

Figure 1 represents a side view of a pipe-wrench having my invention, in part, applied; and Fig. 2, a longitudinal face or edge view of the same, the stock or shank in both views being broken off short.

A indicates the stock or shank and handle portion of a pipe-wrench provided with a fixed outer jaw, B, which is grooved across its face or acting surface, forming teeth $b$, to give hold or bite on the pipe or article being worked by the wrench, and which teeth are set inclining, being cut oblique to the sides of the jaw for the purpose of securing a better hold or greater freedom from slip on the pipe or other body. This obliquity of the teeth $b$ forms no part of the present invention.

C is the movable jaw, which is fitted to slide upon and along the shank A to provide for its adjustment relatively to the outer fixed jaw, B. This movable jaw C is held or positively and stably locked in the different positions on the shank to which it has been adjusted by means of a spring thumb-lever latch or catch, D, fitted to engage by an attached side pin, $d$, with any one of a series of separated cross grooves or recesses, $e$, in the portion of the shank A along which the movable jaw C is adjustable. This lever-catch D is constructed with a thin or reduced body part, $f$, whereby it is made elastic and automatically closing in itself, and therefore does not require an independent spring to close it and cause its pin $d$ to engage with the recesses $e$ to hold the movable jaw at its point of adjustment, and is much less liable to get out of order than when a separate spring controlling the latch is used. Said lever-catch is secured at its one end to the side of the movable jaw C by a screw-pin, $g$, and by a plain stud or pin, $h$, arranged eccentrically to the screw pin or bolt $g$, and fitted to enter a suitable hole in the side of the jaw. This eccentric stud or pin $h$ keeps the lever-catch D from turning on the screw-pin $g$. The opposite or free end of the lever-catch E is constructed to form a thumb-piece, $i$, by which the catch may be lifted out of engagement with either one of the recesses $e$ when it is required to change the adjustment of the jaw C along the shank of the wrench. The pin $d$, which locks or engages with the recesses $e$ in the wrench-shank, is free to play, during the manipulation or working of the lever-catch, within slots $k$, through and in both sides of the jaw C, and is guided and held by the walls of said slots against strain upon it liable to twist off or bend it when the wrench is at work. Thus when strain is put upon the movable jaw C, as when the wrench is in use, the back of the recess $e$, with which the pin $d$ engages, will take the main strain and bear upon the center portion of the pin $d$ on its one side, and the front walls of the slots $k$ will bear in an opposite direction or with a counteracting pressure upon the ends of said pin on its opposite side, and both ends of the pin $d$ will be supported by the front walls of the slots $k$, thus giving great stability and strength to the locking device.

Having thus described my invention, what I claim as new, and desire to secure by Letters Patent, is—

In a pipe or other wrench, the combination, with the shank A, having spaced locking-recesses $e$, of the adjustable jaw C, having slots $k$ in and through it, and the spring lever-catch D, attached to the one side of said jaw and having an attached side locking-pin, $d$, adapted to pass through said slots $k$ and to engage with the recesses $e$ in the shank, whereby, when strain is put upon the wrench, a counteracting support is obtained for the projecting side pin, $d$, by the front walls of the slots $k$ to the thrust on the central portion of the opposite side of said pin against the back wall of the recess $e$, with which the locking-pin engages, essentially as shown and described.

WILLIAM B. RISDON.

Witnesses:
CONSTANTIA J. MURRAY,
ALFRED L. ECCLES.